US010690818B2

United States Patent
Chen et al.

(10) Patent No.: US 10,690,818 B2
(45) Date of Patent: Jun. 23, 2020

(54) ANTI-GLARE SUBSTRATES WITH A UNIFORM TEXTURED SURFACE AND LOW SPARKLE AND METHODS OF MAKING THE SAME

(71) Applicant: CORNING INCORPORATED, Corning, NY (US)

(72) Inventors: Haixing Chen, Shanghai (CN); Ling Chen, Shanghai (CN); Haofei Gong, Shanghai (CN); Liping Hong, Shanghai (CN); Cheng-Chung Li, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/508,307

(22) PCT Filed: Sep. 4, 2015

(86) PCT No.: PCT/US2015/048517
§ 371 (c)(1),
(2) Date: Mar. 2, 2017

(87) PCT Pub. No.: WO2016/069113
PCT Pub. Date: May 6, 2016

(65) Prior Publication Data
US 2017/0285227 A1     Oct. 5, 2017

Related U.S. Application Data

(60) Provisional application No. 62/073,224, filed on Oct. 31, 2014.

(51) Int. Cl.
*G02B 5/02* (2006.01)
*G02B 1/12* (2006.01)

(52) U.S. Cl.
CPC ............. *G02B 5/0221* (2013.01); *G02B 1/12* (2013.01); *G02B 5/0268* (2013.01); *G02B 5/0294* (2013.01)

(58) Field of Classification Search
CPC ...... G02B 5/0221; G02B 1/12; G02B 5/0268; G02B 5/0294
(Continued)

(56) References Cited

U.S. PATENT DOCUMENTS 2,275,602 A * 3/1942 Beck ................. G02B 5/0221
156/99
8,312,739 B2   11/2012 Lee et al.
(Continued)

FOREIGN PATENT DOCUMENTS

CN      101314522 A    12/2008
JP      2009109683 A    5/2009
(Continued)

OTHER PUBLICATIONS

Simonsen et al. "Haze of surface random systems: An approximate analytic approach" arXiv:0904.3753v1 [physics.optics] (Year: 2009).*
(Continued)

*Primary Examiner* — George G King
(74) *Attorney, Agent, or Firm* — Kevin M. Johnson

(57) ABSTRACT

Embodiments of an anti-glare article and methods for forming the same are disclosed. In one or more embodiments, the anti-glare article includes a substrate having a surface, and a plurality of features disposed on the surface, wherein about 50% or more of the plurality of features comprise a normalized area in the range from about 0.5 to about 1.5, and the normalized area is defined as the relationship (surface area of a feature/average surface area of all features). In some embodiments, about 90% or more of the features have a surface area of about 100 micrometers or less. The
(Continued)

anti-glare article exhibits a PPDr of about 5% or less, a transmission haze of less than about 20% and a DOI of less than about 90%. Methods of forming the substrate are also disclosed and include etching a surface of a substrate with an etchant comprising a water soluble metal ion salt.

20 Claims, 13 Drawing Sheets

(58) Field of Classification Search
USPC .......................................................... 359/601
See application file for complete search history.

(56) References Cited

U.S. PATENT DOCUMENTS

| | | | |
|---|---|---|---|
| 8,561,429 B2 | 10/2013 | Allan et al. | |
| 8,598,771 B2 | 12/2013 | Carlson et al. | |
| 10,040,718 B2 | 8/2018 | Hou et al. | |
| 2007/0195419 A1* | 8/2007 | Tsuda | C03C 1/008 359/601 |
| 2010/0136228 A1 | 6/2010 | Richter et al. | |
| 2010/0246016 A1 | 9/2010 | Carlson et al. | |
| 2011/0062849 A1 | 3/2011 | Carlson et al. | |
| 2011/0267697 A1 | 11/2011 | Kohli et al. | |
| 2011/0267698 A1 | 11/2011 | Guilfoyle et al. | |
| 2011/0268978 A1 | 11/2011 | Watanabe et al. | |
| 2012/0134024 A1 | 5/2012 | Lander et al. | |
| 2012/0218640 A1* | 8/2012 | Gollier | C03C 15/00 359/609 |
| 2013/0230733 A1 | 9/2013 | Nakamura et al. | |
| 2015/0336301 A1* | 11/2015 | Kobrin | B29C 33/3857 428/195.1 |

FOREIGN PATENT DOCUMENTS

| | | |
|---|---|---|
| JP | 05076334 B2 | 11/2012 |
| KR | 2010107416 A | 10/2010 |
| TW | I429956 B | 3/2014 |
| WO | 2012166449 | 12/2012 |
| WO | 2014189775 A1 | 11/2014 |

OTHER PUBLICATIONS

Gollier et al. Display Sparkle Measurement and Human Response, DIF 2013 Digest, p. 295-297.
Frayret, J., Eterradossi, O., Castetbon, A., Potin-Gautier, M., Trouve, G., Roulhac, H. Determination of the correlation between physical measurement of roughness, optical properties, and perception of frosted glass surfaces, Applied optics, vol. 47, 21, 2008, 3932.
Wong, L., Suratwala, T., Feit, M. D., Miller, P. E., Steele, R. The effect of HF/NH4F etching on the morphology of surface fracture on fused silica, Journal of non-crystalline solids, 355, 2009, 797.
Cairns, D. R., Evans, P., Laser speckle of textured surfaces: towards high performance anti-glare surfaces, SID 07 Digest, 407.
Taguchi, T., Hayashi, H., Fujii, A., Tsuda, K., Yamada, N., Minoura, K., Isurugi, A., Ihara. I.; Itoh, Y., Distinguished paper: Ultra-low-reflective 60-in. LCD uniform Moth-Eye surface for digital signage, SID 10 Digest, 1196.
Spierings G. A. C. M. Wet chemical etching of silicate glasses in hydrofluoric acid based solutions, Journal of materials science, 28, 1993, 6261.
English Translation of CN201580059508.1 First Office Action dated Aug. 1, 2018, China Patent Office, 12 Pgs.
English Translation of TW104130808 Office Action and Search Report dated Dec. 3, 2018, Taiwan Patent Office, 2 Pgs.
Machine Translation From Global Dossier for JP2017523444 Office Action dated Jul. 24, 2019; 9 Pages; Japanese Patent Office.

* cited by examiner

--Prior Art--

Feature Area Distribution

ANTI-GLARE SUBSTRATES WITH A UNIFORM TEXTURED SURFACE AND LOW SPARKLE AND METHODS OF MAKING THE SAME

CROSS-REFERENCE TO RELATED APPLICATIONS

This application is a national stage entry of International Patent Application Serial No. PCT/US15/48517 filed on Sep. 4, 2015, which claims the benefit of priority under 35 U.S.C. § 119 of U.S. Provisional Application Ser. No. 62/073,224 filed on Oct. 31, 2014 the content of which is relied upon and incorporated herein by reference in its entirety.

BACKGROUND

The disclosure relates to substrates exhibiting anti-glare properties and more particularly to substrates exhibiting uniform textured surface and low sparkle. Methods for making such substrates are also disclosed.

Advances in consumer electronic technology has necessitated improvements in various cover substrate properties. One such area for improvement is anti-glare surfaces for consumer electronic devices such as smart (mobile) phones, tablets, electronic readers, displays and TVs.

Reduction of the specular reflection is often a desired property in touch sensitive electronic devices, electronic ink readers, interactive whiteboards, and other portable LCD panels, especially when used in certain light conditions. Cover substrates exhibiting such properties can be realized by coating with anti-reflection layers or creating textures on the surface (thus forming an anti-glare surface). The surface texture reduces the reflection light through the random scattering of the reflected light and leads to a blurred reflective image.

For consumer electronic applications, known anti-glare surfaces can exhibit sparkle (or a grainy appearance) at low transmittance haze levels (e.g., about 10% or less). Display "sparkle" is a phenomenon that can occur when anti-glare or light scattering surfaces are incorporated into a display system. Sparkle is associated with a very fine grainy appearance that can appear to have a shift in the pattern of the grains with changing viewing angle of the display. This type of sparkle is observed when pixelated displays such as LCDs are viewed through an antiglare surface. Such sparkle is of a different type and origin from "sparkle" or "speckle" that has been observed and characterized in projection or laser systems As displays exhibit higher definition and more pixels are assembled at higher densities, the reduction of sparkle becomes more important. Known anti-glare technologies, such as anti-glare film lamination, sand blasting, sol-gel coating, tend to produce significant sparkle. Accordingly, there is a need for anti-glare surfaces that exhibit low sparkle, while still exhibiting low DOI and low transmission haze.

SUMMARY

Aspects of this disclosure pertain to optimizing the relationship between surface texture and the low sparkle. As will be described, the anti-glare substrates described herein and the methods for making the same provide a surface with about 50% or more of the normalized feature area percentage in the range from about 0.5 to about 1.5, which significantly reduces sparkle.

A first aspect of this disclosure pertains to a substrate that exhibits low sparkle (in terms of low pixel power deviation reference or PPDr) and articles including such substrates. One or more embodiments of this disclosure include an anti-glare article including a substrate with a surface and a plurality of features disposed on the surface. In some embodiments, about 50% or more of the plurality of features have a normalized area in the range from about 0.5 to about 1.5. The phrase normalized area is defined as the relationship: (surface area of a feature/average surface area of all features). In some variants, about 90% or more of the features have a surface area of about 100 µm$^2$ or less. In some variants, about 18% or less of the plurality of features has an average surface area of greater than about 400 nm$^2$. In some variants, about 15% or less of the plurality of features has an average surface area of greater than about 400 nm$^2$.

In one or more embodiments, the article a roughness average (Ra) of about 0.15 micrometers or less. In some embodiments, the article exhibits a PPDr value of about 5% or less. The article of one or more embodiments also exhibits a transmission haze of less than about 20%. In some instances, the substrate surface including the plurality of features exhibits a DOI of less than about 90%. In some instances, the substrate surface including the plurality of features exhibits a gloss at 60° of about 87% or less.

A second aspect of this disclosure pertains to a method of forming an antiglare surface or more specifically, a substrate with an anti-glare surface. In one or more embodiments, the anti-glare surface comprises a plurality of features. In some embodiments, about 50% or more of the plurality of features comprise a normalized area in the range from about 0.5 to about 1.5. In some embodiments, the resulting substrate exhibits a transmission haze or about 20% or less and/or a PPD of about 6 or less. In some embodiments, anti-glare surface exhibits a DOI of about 90% or less and/or a gloss at 60° of about 87% or less.

In one or more embodiments, the method of forming a substrate with an anti-glare surface includes etching a portion of a first surface of a substrate with an etchant to provide an etched surface and removing a portion of the etched surface to provide the anti-glare surface. In some embodiments, the method includes forming an acid-resistant film on a second surface of the substrate before etching of the first surface. In some embodiments, etching a portion of the first surface of the substrate includes contact the first surface with the etchant for less than about 5 minutes. In some embodiments, removing a portion of the etched surface comprises contacting the etched surface with an acid solution for less than 15 minutes.

In one or more embodiments, the etchant includes a water soluble metal ion salt. Examples of suitable water soluble metal ion salts include $CuCl_2$, $Cu(NO_3)_2$, $CuSO_4$, $FeCl_3$, $Fe_2(SO_4)_3$, $Fe(NO_3)_3$, $COCl_2$, $Co_2SO_4$, $Co(NO_3)_2$, $NiCl_2$, $Ni_2SO_4$, $Ni(NO_3)_2$, $ZnCl_2$, $Zn_2SO_4$, $Zn(NO_3)_2$, $CaCl_2$, $Ca_2SO_4$, $Ca(NO_3)_2$, $MgCl_2$, $Mg_2SO_4$, $Mg(NO_3)_2$, $NH_4Cl$ or combinations thereof. In some embodiments, the etchant includes a fluoride containing acid and a filler. Examples of suitable fluoride containing acids include $NH_4F$, $NH_4HF_2$ or combinations thereof. The filler used in some embodiments of the etchant can include an inorganic salt such as $BaSO_4$, $CaF_2$, $MgF_2$, kaolin or combinations thereof. In some embodiments, the etchant includes a soluble starch. In some embodiments, the etchant may include a soluble polymeric surfactant such as polyacrylamide, polyacrylic acid, poly (styrenesulfonate) and combinations thereof. Optionally, the etchant may include $KNO_3$.

The acid solution utilized in some embodiments may include HF, HCl or a combination thereof.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to various embodiment(s) of this disclosure A first aspect of this disclosure pertains to a substrate exhibiting anti-glare properties and articles including the same. Specifically, the anti-glare substrate exhibits low sparkle in terms of a PPDr of about 5% or less, low transmission haze (e.g., less than about 20%), low DOI (e.g., less than about 90%) and low gloss at 60° (e.g., about 87% or less), as measured on the surface including the anti-glare surface (or textured or roughened surface).

Figure 1:
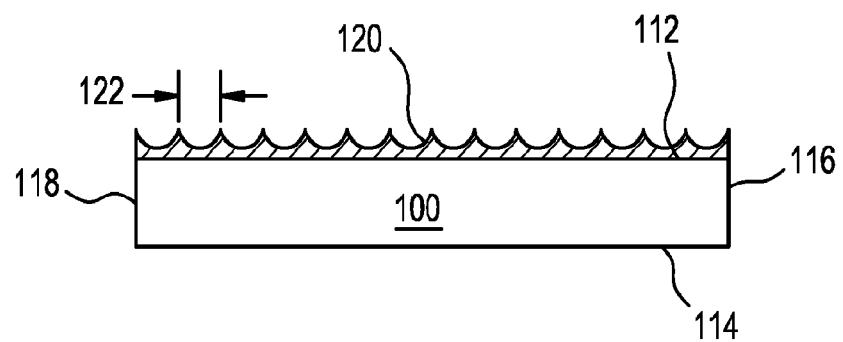
FIG. 1 is a side view illustration of one embodiment.
Figure 2:
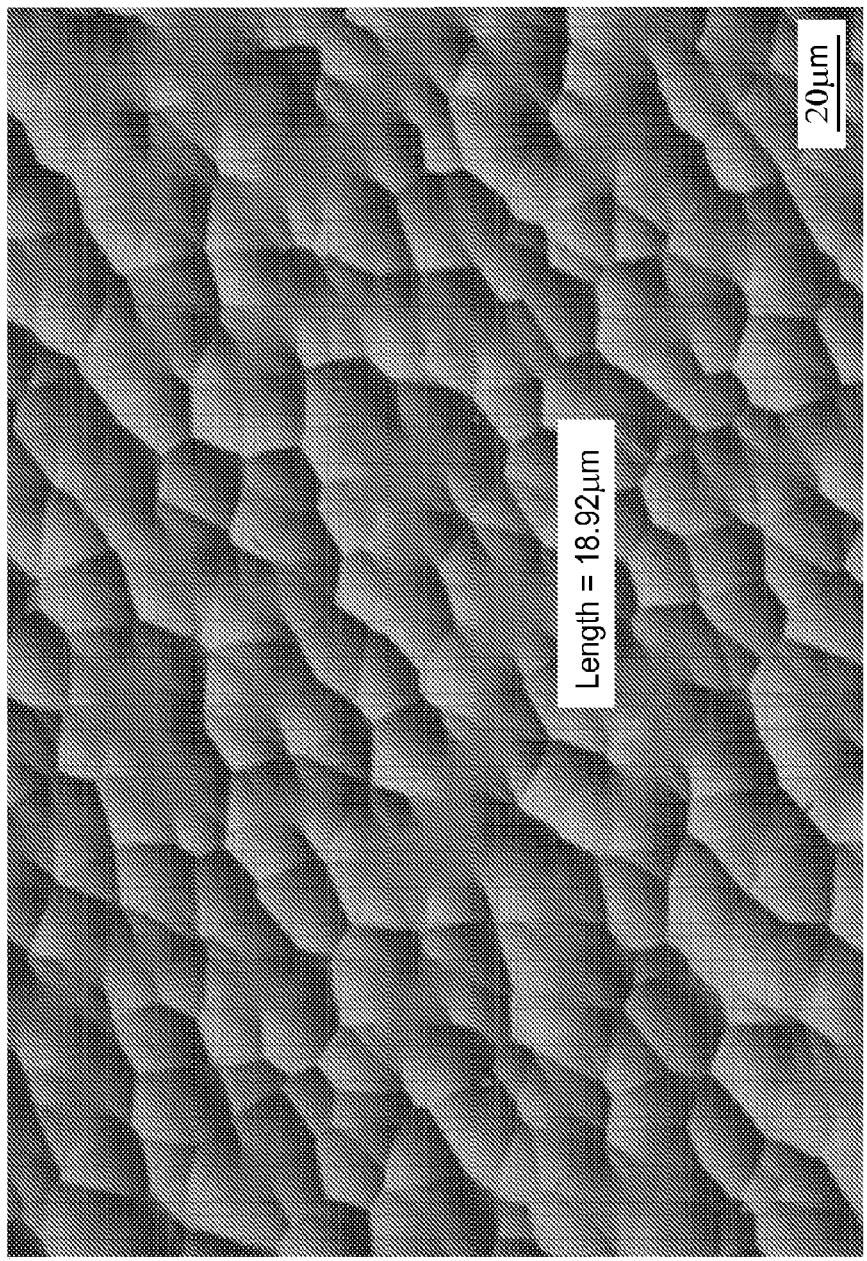
FIG. 2 is an optical microscope image of Example 1.
Figure 3:
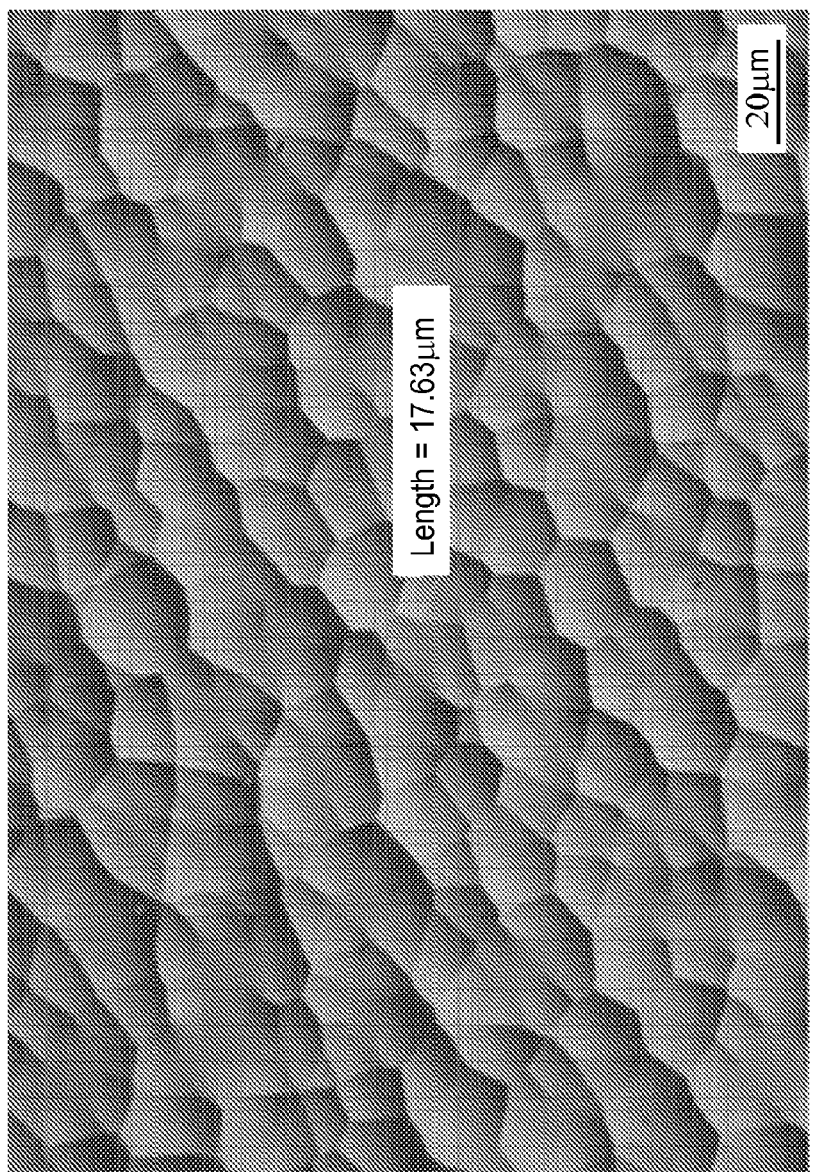
FIG. 3 is an optical microscope image of Example 6.
Figure 4:
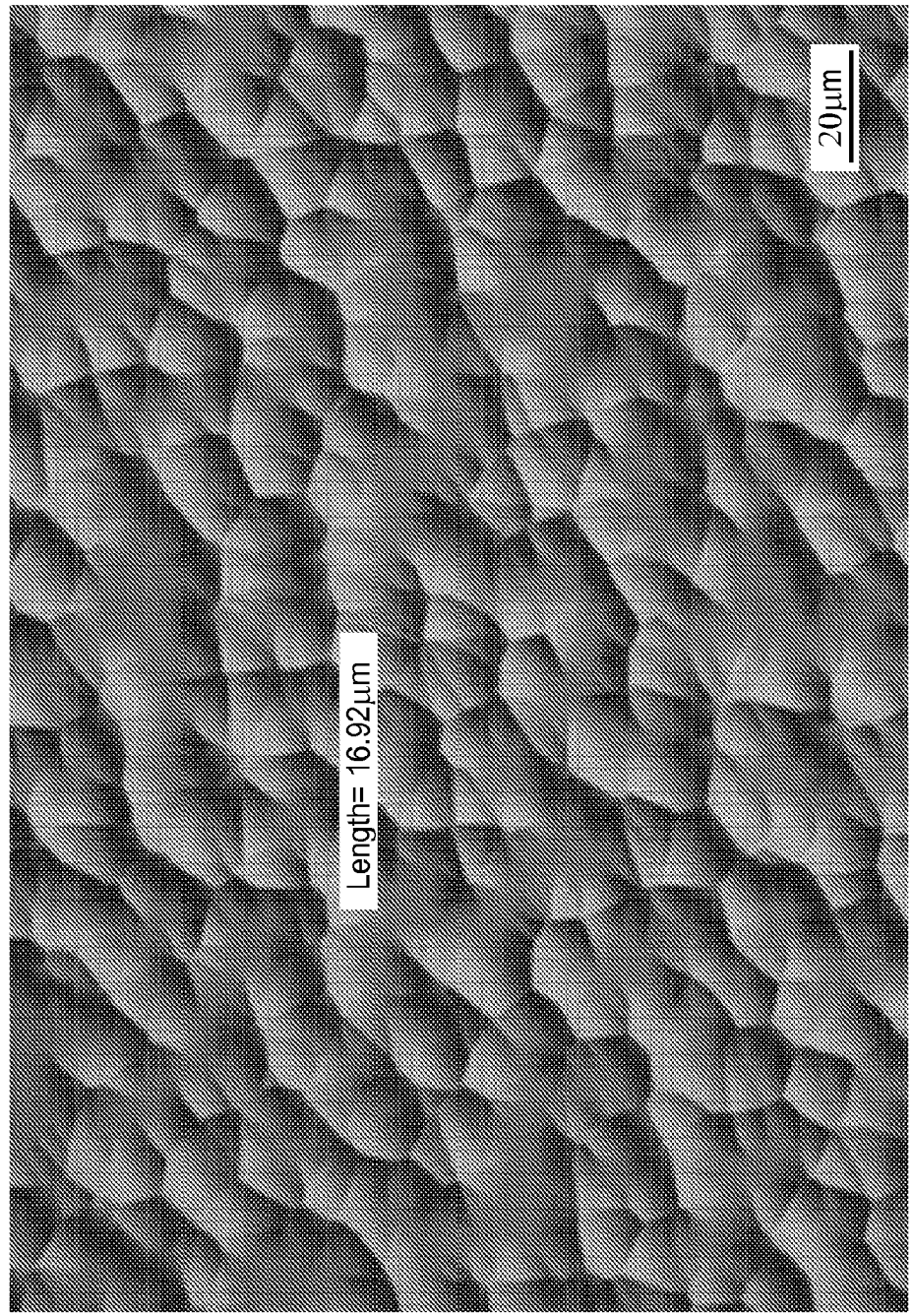
FIG. 4 is an optical microscope image of Example 12.
Figure 5:
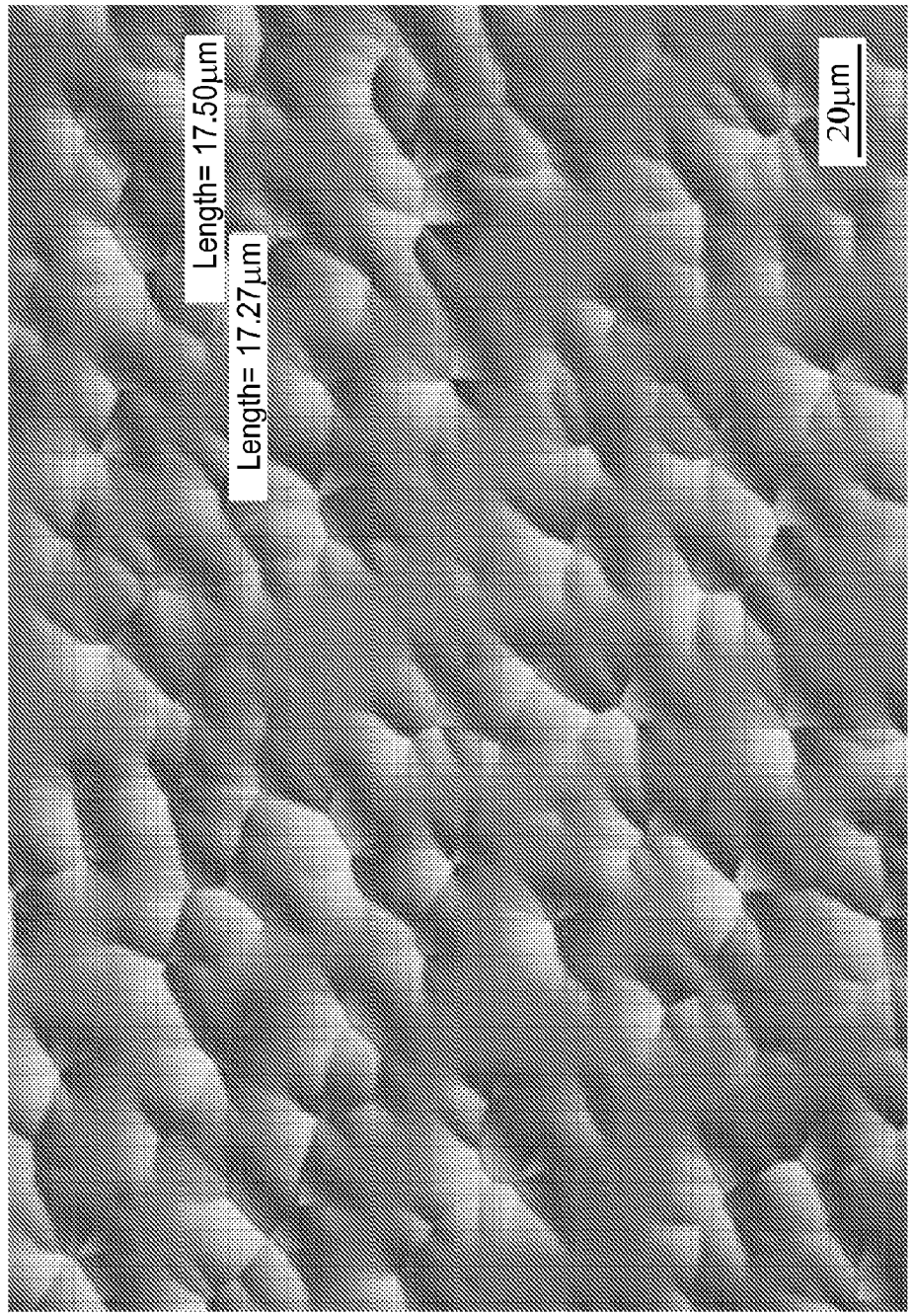
FIG. 5 is an optical microscope image of Example 21.

Referring to FIG. 1, in one or more embodiments, the substrate 100 includes opposing major surfaces 112, 114 and opposing minor surfaces 116, 118. In some embodiments, at least one surface (e.g., a major surface) includes a texture (referred to herein as a textured surface 120) with a plurality of features 122. The texture may extend across a portion of the surface, the entire surface or on more than one surface. The texture may be referred to as roughened. The features 120 may be described as concave shape extending into the substrate from the surface with an opening at the surface, facing outwardly from the surface, as shown in FIG. 1.

Unless otherwise stated, the anti-glare performance of the substrate 100 in terms of DOI and gloss is measured on the surface with the texture or the plurality of features 122, in reflected mode (i.e., without taking into account the other surfaces of the substrate). PPDr and transmission haze performance is in terms of the entire substrate, since these values are measured in the transmitted mode.

The plurality of features has a narrow surface area distribution and thus the surface has a uniform texture. In one or more embodiments, the about 50% or more of the plurality of features have a normalized area in the range from about 0.25 to about 1.75 (or from about 0.5 to about 1.5, from about 0.6 to about 1.4, from about 0.7 to about 1.3, or from about 0.75 to about 1.25). As used herein, the phrase "normalized area" is defined as the relationship: (surface area of a feature/average surface area of all features).

In one or more embodiments, a significant portion of the plurality of features has a surface area of about 100 $\mu m^2$ or less. For example, in some embodiments about 90% or more of the plurality of features have a surface area of about 100 $\mu m^2$ micrometers or less. In some instances, about 90% or more of the features have a surface area of about 90 $\mu m^2$ or less, about 80 $\mu m^2$ or less, about 70 $\mu m^2$ or less, or about 60 $\mu m^2$ or less.

In some instances, a small portion of the plurality of features have a surface area greater than about 100 $\mu m^2$ and even fewer of the plurality of features have a surface of about 400 $\mu m^2$ or more. For example, in some embodiments about 20% or less (or about 18% or less) of the plurality of features has an average surface area of about 400 $nm^2$ or greater. In some instances, about 20% or less of the plurality of features has an average surface area of about 450 $nm^2$ or greater, about 500 $nm^2$ or greater, about 550 $nm^2$ or greater, or about 600 $nm^2$ or greater. In one or more embodiments, about 15% or less of the plurality of features has an average surface area of greater than about 400 $nm^2$.

The plurality of features may be characterized in terms of feature size, which may be described in terms of an average longest cross-sectional dimension of the feature(s). In one or more embodiments, the plurality of features may have an average longest cross-sectional dimension in the range from about 5 micrometers ($\mu m$) to about 50 micrometers ($\mu m$), or more specifically, from about 5 micrometers ($\mu m$) to about 30 micrometers ($\mu m$). As used herein, the term "longest cross-sectional dimension" refers to the longest single dimension of the features. Thus, to clarify, when a feature is circular, the longest cross-sectional dimension is its diameter; when a feature is oval-shaped, the longest cross-sectional dimension is the longest diameter of the oval; and when a feature is irregularly-shaped, the longest cross-sectional dimension is the line between the two farthest opposing points on its perimeter. The term "average" when used with "longest cross-sectional dimension" includes the average of the measured longest cross-sectional dimensions of at least 20 different features on the same sample.

In some embodiments, the textured surface may be characterized in terms of its average roughness (Ra). The anti-glare surface may have a Ra of about 0.15 micrometers ($\mu m$) or less. In some instances, the anti-glare surface may have a Ra of about 0.14 micrometers ($\mu m$) or less, about 0.13 micrometers ($\mu m$) or less, about 0.12 micrometers ($\mu m$) or less, about 0.11 micrometers (μm) or less, or about 0.1 micrometers (μm) or less. In some instances, the Ra may be about 0.6 micrometers (μm) or less. In all instances, the Ra value is about 0.01 micrometers (μm) or greater.

In one or more embodiments, the textured surface may be characterized by the root mean square average of the profile height deviations from an average (RMS). In one or more embodiments, the textured surface may have an RMS of about 200 nanometers (nm) or greater. In some instances, the textured surface may have an RMS in the range from about 200 nanometers (nm) to about 300 nanometers (nm), or from about 200 nanometers (nm) to about 260 nanometers (nm).

In one or more embodiments, the substrate exhibits low sparkle which may be characterized by a pixel power deviation reference or PPDr of about 5% or less, about 4.5% or less, about 4% or less, about 3.5% or less, or about 3% or less. As used herein, the terms "pixel power deviation referenced" and "PPDr" refer to the quantitative measurement for display sparkle. Unless otherwise specified, PPDr is measured using a display arrangement that includes an edge-lit LCD screen (twisted nematic LCD) having a native sub-pixel pitch of 60 μm×180 μm and a sub-pixel opening window size of about 44 μm×about 142 μm. The front surface of the LCD screen had a glossy, anti-reflection type linear polarizer film. To determine PPDr of a display system or an anti-glare surface that forms a portion of a display system, a screen is placed in the focal region of an "eye-simulator" camera, which approximates the parameters of the eye of a human observer. As such, the camera system includes an aperture (or "pupil aperture") that is inserted into the optical path to adjust the collection angle of light, and thus approximate the aperture of the pupil of the human eye. In the PPDr measurements described herein, the iris diaphragm subtends an angle of 18 milliradians.

PPDr measurements can be distinguished from PPD measurements used to characterize known anti-glare surfaces. PPDr includes a normalized standard deviation of pixel power and is more fully described in J. Gollier et al., "Display sparkle measurement and human response," SID-Symposium of Technical Papers 44, No. 1, 295-297 (2013). To calculate the PPD contribution from the display alone, the pixel power variation the emissive display without the anti-glare surface is removed to provide a PPDr measurement (denoting a referenced measurement). Generally, a first image of the bare display is taken and used as a reference for the image taken with the test sample containing the anti-glare surface. The boundaries between adjacent pixels are calculated by summing the lines then rows in the image and determining the minima. For very noisy images the locations of the integrated regions may need to be estimated using the knowledge that the pixel pitch in the emissive display is constant. The background counts observed in the dark regions between the pixels is subtracted from the image to remove camera dark counts or other scattered light within the display. Total power within each pixel is then integrated and normalized by dividing by the pixel powers from the reference image. The standard deviation of the distribution of pixel powers is then calculated to give the PPDr value.

More specifically, in measuring PPDr, a uniform green patch of an LCD pixel is used as a source. Only the green sub-pixels are illuminated with a minimum measurement area of about 20×20 LCD pixels. Test images ($T_{ij}$) and reference images ($R_{ij}$) are acquired. The reference image removes non-uniformity in source intensity distribution. The image of the LCD pixels as viewed through the iris is collected by a CCD (charge-coupled device) camera having at least about 20 CCD pixels per LCD pixel. Background values (bg) are also determined to remove contributions from stray light and dark counts. The PPDr value is determined by equations (1) and (2).

$$A_{ij}=(T_{ij}-bg)/(R_{ij}-bg) \quad (1)$$

$$PPDr=\text{St. Dev.}\ [A_{ij}]*100 \quad (2)$$

PPDr measurements may be taken at 0° and at 90°. PPDr values recited herein refer to the mathematical average of these measurements.

In some embodiments, the anti-glare surface exhibits a 20° distinctness of image (DOI) of about 90 or less (e.g., about 85 or less, about 80 or less, about 60 or less, or about 40 or less). As used herein, the term "distinctness of image" is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety. In accordance with method A of ASTM 5767, substrate reflectance factor measurements are made on the anti-glare surface at the specular viewing angle and at an angle slightly off the specular viewing angle. The values obtained from these measurements are combined to provide a DOI value. In particular, DOI is calculated according to the equation $$DOI = \left[1 - \frac{Ros}{Rs}\right] \times 100, \quad (3)$$

where Ros is the relative reflection intensity average between 0.2° and 0.4 away from the specular reflection direction, and Rs is the relative reflection intensity average in the specular direction (between +0.05° and −0.05°, centered around the specular reflection direction). If the input light source angle is +20° from the sample surface normal (as it is throughout this disclosure), and the surface normal to the sample is taken as 0°, then the measurement of specular reflected light Rs is taken as an average in the range of about −19.95° to −20.05°, and Ros is taken as the average reflected intensity in the range of about −20.2° to −20.4° (or from −19.6° to −19.8°, or an average of both of these two ranges). As used herein, DOI values should be directly interpreted as specifying a target ratio of Ros/Rs as defined herein. In some embodiments, the anti-glare surface has a reflected scattering profile such that >95% of the reflected optical power is contained within a cone of +/−10°, where the cone is centered around the specular reflection direction for any input angle.

In some embodiments, the anti-glare surface described herein has a transmission haze value of about 20% or less. In some embodiments, the transmission haze of the transparent glass sheet about 18% or less, about 16% or less, about 15% or less, about 14% or less, about 12% or less, about 10% or less, or about 8% or less. As used herein, the terms "transmission haze" and "haze" refer to the percentage of transmitted light scattered outside an angular cone of about ±2.5° in accordance with ASTM procedure D1003. For an optically smooth surface, transmission haze is generally close to zero.

The substrate used to form the anti-glare surface may be inorganic and may include an amorphous substrate, a crystalline substrate or a combination thereof. In one or more embodiments, the substrate may be amorphous and may include glass, which may be strengthened or non-strengthened. Examples of suitable glass include soda lime glass, alkali aluminosilicate glass, alkali containing borosilicate glass and alkali aluminoborosilicate glass. In one or more alternative embodiments, the substrate may include crystalline substrates such as glass ceramic substrates (which may be strengthened or non-strengthened) or may include a single crystal structure, such as sapphire. In one or more specific embodiments, the substrate includes an amorphous base (e.g., glass) and a crystalline cladding (e.g., sapphire layer, a polycrystalline alumina layer and/or or a spinel ($MgAl_2O_4$) layer).

The substrate may be substantially planar or sheet-like, although other embodiments may utilize a curved or otherwise shaped or sculpted substrate. The substrate may be substantially optically clear, transparent and free from light scattering. In such embodiments, the substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0%. The substrate may optionally exhibit a color, such as white, black, red, blue, green, yellow, orange etc.

Additionally or alternatively, the physical thickness of the substrate may vary along one or more of its dimensions for aesthetic and/or functional reasons. For example, the edges of the substrate may be thicker as compared to more central regions of the substrate 100. The length, width and physical thickness dimensions of the substrate may also vary according to the application or use.

The substrate may be provided using a variety of different processes. For instance, where the substrate includes an amorphous substrate such as glass, various forming methods can include float glass processes and down-draw processes such as fusion draw and slot draw.

Once formed, a substrate may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), depth of compressive stress layer (or depth of layer) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass substrates are strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of central tension (CT), surface CS, and depth of layer (DOL). Surface CS may be measured near the surface or within the strengthened glass at various depths. A maximum CS value may include the measured CS at the surface ($CS_s$) of the strengthened substrate. The CT, which is computed for the inner region adjacent the compressive stress layer within a glass substrate, can be calculated from the CS, the physical thickness t, and the DOL. CS and DOL are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring CS and DOL are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass substrate. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method. The relationship between CS and CT is given by the expression (1):

$$CT=(CS \cdot DOL)/(t-2DOL) \qquad (1),$$

wherein t is the physical thickness (μm) of the glass article. In various sections of the disclosure, CT and CS are expressed herein in megaPascals (MPa), physical thickness t is expressed in either micrometers (μm) or millimeters (mm) and DOL is expressed in micrometers (μm).

In one embodiment, a strengthened substrate can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOL of 10 μm or greater, 15 μm or greater, 20 μm or greater (e.g., 25 μm, 30 μm, 35 μm, 40 μm, 45 μm, 50 μm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a surface CS greater than 500 MPa, a DOL greater than 15 μm, and a CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass composition includes at least 6 wt. % aluminum oxide. In a further embodiment, the substrate includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate can comprise 61-75 mol. % SiO2; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for the substrate comprises alumina, at least one alkali metal and, in some embodiments, greater than 50 mol. % $SiO_2$, in other embodiments at least 58 mol. % $SiO_2$, and in still other $$\frac{Al_2O_3 + B_2O_3}{\Sigma \text{ modifiers}} > 1,$$

embodiments at least 60 mol. % $SiO_2$, wherein the ratio where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\Sigma \text{ modifiers}} > 1.$$

In still another embodiment, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO$ 69 mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In an alternative embodiment, the substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

Where the substrate includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate may include a glass ceramic substrate, which may be strengthened or non-strengthened. Examples of suitable glass ceramics may include $Li_2O$—$Al_2O_3$—$SiO_2$ system (i.e. LAS-System) glass ceramics, MgO—$Al_2O_3$—$SiO_2$ system (i.e. MAS-System) glass ceramics, and/or glass ceramics that include a predominant crystal phase including β-quartz solid solution, β-spodumeness, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate according to one or more embodiments can have a physical thickness ranging from about 100 μm to about 5 mm. Example substrate physical thicknesses range from about 100 μm to about 500 μm (e.g., 100, 200, 300, 400 or 500 μm). Further example substrate physical thicknesses range from about 500 μm to about 1000 μm (e.g., 500, 600, 700, 800, 900 or 1000 μm). The substrate may have a physical thickness greater than about 1 mm (e.g., about 2, 3, 4, or 5 mm). In one or more specific embodiments, the substrate may have a physical thickness of 2 mm or less or less than 1 mm. The substrate may be acid polished or otherwise treated to remove or reduce the effect of surface flaws.

Examples of articles that may include such anti-glare substrates include displays used in electronic devices such as laptops, mobile phones, smart phones, tablets, electronic readers, point of sale devices, inventory devices, navigation systems, automotive dashboards, automotive consoles, appliances (e.g., stoves, ranges, dishwashers, and refrigerators). The anti-glare substrates described herein may also be used in the housings of such electronic devices for decorative purposes. The anti-glare substrates may also be incorporated into architectural articles such as countertops, windows, elevators and the like).

A second aspect of this disclosure pertains to methods of forming the anti-glare substrates described herein. The method includes providing a substrate as described herein having a surface, and etching a portion of the surface to provide or form an etched surface. The method includes removing a portion of the etched surface to provide an anti-glare surface having a textured surface including a plurality of features, as described herein.

In one or more embodiments, the substrate may be prepared for etching. In some embodiments, the substrate is cleaned to remove contaminants and then rinsed in a bath of ultrasonically agitated DI water. The cleaning solution may include a detergent and water. After cleaning and rinsing, the substrate may be laminated with an acid-resistant film on a surface of the substrate that is not being treated (e.g., surfaces 114, 116 and/or 118 in FIG. 1) before etching the surface 120 to be textured. The substrate with the acid-resistant film(s) may be immersed in a diluted bath of hydrofluoric acid and hydrochloric acid a brief duration (e.g., 5 seconds or 10 seconds) and then rinsed again in DI water for a short duration of time. Thereafter, the surface 120 is exposed to the etchant to form an etched surface and then a portion of the etched surface may be removed. The substrate may be dipped into a tank or bath containing the etchant. The exposure time of the surface 120 to the etchant may be less than about 5 minutes. In some instances, the exposure time of the substrate to the etchant is in the range from about 30 seconds to about 240 seconds, from about 30 seconds to about 220 seconds, from about 30 seconds to about 200 seconds, from about 30 seconds to about 180 seconds, from about 30 seconds to about 160 seconds, from about 30 seconds to about 140 seconds, from about 30 seconds to about 120 seconds, from about 30 seconds to about 100 seconds, from about 30 seconds to about 80 seconds, from about 30 seconds to about 60 seconds, from about 60 seconds to about 240 seconds, from about 80 seconds to about 240 seconds, from about 100 seconds to about 240 seconds, from about 120 seconds to about 240 seconds, from about 140 seconds to about 240 seconds, from about 160 seconds to about 240 seconds, or from about 180 seconds to about 240 seconds. In some instances, the duration of the etching step may be modified to form sufficient precipitates on the surface 120, which act as a mask for the subsequent removal of a portion of a thickness of the etched surface.

In some embodiments, after the etched surface (which includes precipitates) is formed, the substrate may be rinsed to remove the etchant (e.g., by immersing the substrate in a DI water tank for about 20 seconds or less or about 10 seconds). Thereafter, the portion of the etched surface is removed by exposing the etched surface (or the entire substrate with the acid-resistant film(s) disposed thereon) in a acid solution for less than about 15 minutes. For example, in some instances the exposure time of the etched surface to the acid solution may be from about 2 minutes to about 15 minutes, from about 4 minutes to about 15 minutes, from about 5 minutes to about 15 minutes, from about 6 minutes to about 15 minutes, from about 8 minutes to about 15 minutes, from about 10 minutes to about 15 minutes, from about 2 minutes to about 14 minutes, from about 2 minutes to about 12 minutes, from about 2 minutes to about 10 minutes, from about 2 minutes to about 8 minutes, from about 2 minutes to about 6 minutes, from about 2 minutes to about 5 minutes, or from about 5 minutes to about 10 minutes.

The resulting substrate with the textured surface or anti-glare surface may be rinsed in DI water. Where applicable, the acid-resistant film may be removed and the substrate may be dried.

In one or more embodiments, the etchant comprises a soluble metal ion salt. The metal ion salt of some embodiments is water soluble. The metal ion may include a transmission metal ion, a non-transition metal ion or a combination thereof. Examples of suitable soluble metal ion salts include $CuCl_2$, $Cu(NO_3)_2$, $CuSO_4$, $FeCl_3$, $Fe_2(SO_4)_3$, $Fe(NO_3)_3$, $CoCl_2$, $Co_2SO_4$, $Co(NO_3)_2$, $NiCl_2$, $Ni_2SO_4$, $Ni(NO_3)_2$, $ZnCl_2$, $Zn_2SO_4$, $Zn(NO_3)_2$, $CaCl_2$, $Ca_2SO_4$, $Ca(NO_3)_2$, $MgCl_2$, $Mg_2SO_4$, $Mg(NO_3)_2$ and $NH_4Cl$. Such soluble metal ion salts may be used in combination or alone. In other words, the etchant may include only one type of soluble metal ion salt or a combination of soluble metal ion salts.

In one or more embodiments, the soluble metal ion salt is present in the etchant in an amount up to about 30 wt %. In some embodiments, the soluble metal ion salt is present in the etchant in an amount in the range from about 1 wt % to about 30 wt %, from about 1 wt % to about 28 wt %, from about 1 wt % to about 25 wt %, from about 5 wt % to about 30 wt %, from about 10 wt % to about 30 wt %, or from about 15 wt % to about 30 wt %.

In some embodiments, the etchant includes a fluoride containing acid which may include $NH_4F$, $NH_4HF_2$, other known fluoride containing acids and combinations thereof. The fluoride containing acid may be present in an amount in the range from about 1 wt % to about 50 wt %, from about 5 wt % to about 50 wt %, from about 10 wt % to about 50 wt %, from about 20 wt % to about 50 wt %, from about 1 wt % to about 45 wt %, from about 1 wt % to about 40 wt %, from about 10 wt % to about 40 wt %, or from about 20 wt % to about 40 wt %. In some instances, the etchant may include $NH_4F$ in an amount in the range from about 10 wt % to about 20% and $NH_4HF_2$ in an amount in the range from about 10 wt % to about 20 wt %.

In some embodiments, the etchant may include an inorganic salt. Examples of such inorganic salts include $BaSO_4$, $CaF_2$, $MgF_2$, kaolin and other known inorganic salts. The etchant may include only one inorganic salt or a combination of inorganic salts. In some embodiments, the inorganic salt may be present in an amount in the range from about 1 wt % to about 30 wt %, from about 5 wt % to about 30 wt %, from about 10 wt % to about 30 wt %, from about 1 wt % to about 25 wt %, from about 1 wt % to about 20 wt %, or from about 5 wt % to about 20 wt %.

The etchant of some embodiments may include a soluble starch or a water soluble starch. Examples of suitable soluble starches include polysaccharides, chitin, cellulose and other such starches. In some embodiments, the etchant includes only one type of soluble starch or may include a combination of soluble starches. The soluble starch may be present in the etchant in an amount in the range from about 0.1 wt % to about 20 wt %, from about 1 wt % to about 20 wt %, from about 5 wt % to about 20 wt %, from 0.1 wt % to about 15 wt %, from about 0.1 wt % to about 10 wt % or from about 1 wt % to about 10 wt %.

The etchant of one or more embodiments may include a soluble polymeric surfactant or a water soluble polymeric surfactant. Examples of suitable surfactants include polyacrylamide, polyacrylic acid, poly(styrenesulfonate) and other known polymeric surfactants. In some embodiments, the etchant includes only one type of polymeric surfactant or may include a combination of polymeric surfactants. The polymeric surfactant may be present in the etchant in an amount in the range from about 0 wt % to about 10 wt %, from about 0 wt % to about 8 wt %, from about 0 wt % to about 5 wt %, from about 0 wt % to about 4 wt %, from about 0 wt % to about 2 wt %, from about 0.1 wt % to about 10 wt %, from about 1 wt % to about 10 wt %, from about 2 wt % to about 10 wt %, from about 4 wt % to about 10 wt %, or from about 0.1 wt % to about 5 wt %.

The etchant may optionally include a potassium salt such KNO$_3$. The potassium salt may be present in the etchant in an amount in the range from about 0 wt % to about 10 wt %, from about 0.1 wt % to about 10 wt %, from about 1 wt % to about 10 wt %, from about 0 wt % to about 5 wt %, or from about 0.1 wt % to about 5 wt %.

In one or more embodiments, the method may include forming the etchant by combining any one or more of the soluble metal ion salt, fluoride containing acid, inorganic salt, soluble starch, soluble polymeric surfactant and optional potassium salt together. Such components of the may be provided in powdered form. DI water in an amount in the range from about 10 wt % to about 40 wt % may be added to the combination with manual agitation. Thereafter, hydrofluoric acid solution (at 20%) is added slowly with manual agitation until a slurry is formed. The total amount of hydrofluoric acid solution added may be in the range from about 5 wt % to about 20 wt %. The slurry may be agitated further using a mechanical agitator for up to 2 hours or 3 hours and kept at ambient conditions for up to 24 hours before using to etch the surface of the substrate. The etchant may be prepared at room temperature (e.g., 24° C.).

Without being bound by theory, the metal ions in the etchant readily adhere to the surface of the substrate and influence the nucleation and growth of precipitates on the surface of the substrate. It is believed that the etchant thus forms a unique mask that provides the uniform textured surface. Without being bound by theory, the metal ions of the etchant are believed to reduce the growth rate of the precipitates on the surface of the substrate.

The acid solution utilized to remove a portion of the etched surface may include hydrofluoric acid (HF), hydrochloric acid (HCl), other known acids and combinations thereof. In some embodiments, the acid solution may include both HF and HCl. In one or more embodiments, the acid solution may have a concentration of HF in the range from about 5 wt % to about 15 wt %, or from about 10 wt % to about 15 wt % or about 12 wt %. In some embodiments, the acid solution may have a concentration of HCl in the range from about 10 wt % to about 20 wt %, from about 12 wt % to about 18 wt % or about 15 wt %. In some instances, the solution may include a remaining portion of water. In one example, the acid solution includes about 12 wt % HF, about 15 wt % HCl and about 73 wt % water.

In one or more embodiments, the etchants described herein, in combination with the acid solution, can provide a substrate with a textured surface that exhibits desirable PPDr, transmission haze, gloss and DOI values, which can be tuned by varying the concentrations of the components of the etchant, within the ranges provided herein, and/or modifying the exposure time to the etchant. For example, the resulting substrates according to one or more embodiments may exhibit a transmission haze of about 20%, a PPDr value of about 5% or less, and DOI value of 90 or less.

In one or more embodiments, the method may include applying a coating on the textured surface. In some instances, reflection from the anti-glare surface may be reduced by application of an anti-reflective coating on the surface. In other embodiments, scratch-resistance may be imparted to the textured surface by applying a scratch-resistant coating on the surface.

EXAMPLES

Various embodiments will be further clarified by the following examples.

Examples 1-29

Each of Examples 1-29 included a glass substrate selected from A-D having nominal compositions, as shown in Table 1. One major surface of each glass substrate was exposed to an etchant having the following composition: about 16 wt % NH$_4$F, about 8 wt % NH$_4$HF$_2$, about 8 wt % KNO$_3$, about 1 wt % polyacrylamide, about 14 wt % of HF acid (at 40% concentration) and about 18 wt % CuCl$_2$, and about 35 wt % DI water. The major surface was exposed to the etchant for a duration in the range from about 1 to 3 minutes and then rinsed, leaving behind an etched surface. A portion of the etched surface was removed by exposing the etched surface to an acid solution including HF and HCl acid, for a duration in the range from about 5 minutes to about 20 minutes.

TABLE 1

Substrate compositions for Examples 1-29.

| Component (mol %) | Substrate A | Substrate B | Substrate C | Substrate D |
|---|---|---|---|---|
| SiO$_2$ | 69.19 | 68.96 | 64.74 | 67.55 |
| B$_2$O$_3$ | 0.00 | 0.00 | 5.14 | 3.67 |
| Al$_2$O$_3$ | 8.52 | 10.28 | 13.94 | 12.67 |
| Na$_2$O | 13.94 | 15.21 | 13.72 | 13.66 |
| K$_2$O | 1.174 | 0.012 | 0.000 | 0.014 |
| MgO | 6.44 | 5.37 | 2.38 | 2.33 |
| CaO | 0.54 | 0 | 0 | 0 |
| SnO$_2$ | 0.19 | 0.17 | 0.08 | 0.10 |

FIGS. 2-5 show optical microscope images of Examples 1, 6, 12 and 21, respectively. The scale in each of FIGS. 2-5 indicates 20 micrometers (μm).

Table 2 includes the measured Ra (micrometers), PPDr measurements taken at 0° and 90° and the average thereof, transmission haze, DOI and gloss at 60° for Examples 1-19. Table 3 included the measured PPDr (average), transmission haze, DOI, gloss at 60°, 85° and 20° and RMS for Examples 20-29.

TABLE 2

Ra, PPDr and Optical Attributes of Examples 1-19.

| | | | PPDr | | | Optical Attributes | | |
|---|---|---|---|---|---|---|---|---|
| Example | Substrate | Ra (μm) | 0° | 90° | Average | Haze (T) | DOI | Gloss (60°) |
| 1 | A | 0.1079 | 4.5 | 4.66 | 4.6 | 13.8 | 66.6 | 55.4 |
| 2 | A | 0.1127 | 4.69 | 4.79 | 4.7 | 15.9 | 58.3 | 49 |
| 3 | B | 0.0916 | 4.61 | 4.91 | 4.8 | 10.6 | 71.3 | 55.2 |
| 4 | B | 0.1103 | 5.13 | 5 | 5.1 | 14 | 44.3 | 45.7 |
| 5 | B | 0.078 | 4.71 | 4.59 | 4.7 | 8.77 | 80.3 | 66.1 |

TABLE 2-continued

Ra, PPDr and Optical Attributes of Examples 1-19.

| Example | Substrate | Ra (μm) | PPDr 0° | PPDr 90° | PPDr Average | Haze (T) | DOI | Gloss (60°) |
|---|---|---|---|---|---|---|---|---|
| 6 | B | 0.0749 | 4.61 | 4.57 | 4.6 | 9.4 | 77 | 69.6 |
| 7 | B | 0.1109 | 4.87 | 4.87 | 4.9 | 14.8 | 51.9 | 45.8 |
| 8 | B | 0.1006 | 4.98 | 4.86 | 4.9 | 12 | 56.8 | 70 |
| 9 | B | 0.0763 | 4.78 | 4.66 | 4.7 | 7.25 | 76.2 | 62.7 |
| 10 | B | 0.0662 | 4.59 | 4.67 | 4.6 | 4.31 | 80.2 | 82.5 |
| 11 | B | 0.1102 | 4.76 | 4.77 | 4.8 | 14.6 | 48.8 | 48 |
| 12 | C | 0.1347 | 4.44 | 4.51 | 4.5 | 18.7 | 60.5 | 45.8 |
| 13 | C | 0.1202 | 4.6 | 4.64 | 4.6 | 16.6 | 75.6 | 45.5 |
| 14 | C | 0.065 | 4.22 | 4.48 | 4.4 | 6.76 | 88.9 | 76.6 |
| 15 | C | 0.1234 | 4.68 | 4.8 | 4.7 | 17.1 | 62.8 | 44.8 |
| 16 | C | 0.1234 | 4.62 | 4.65 | 4.6 | 16.3 | 64.5 | 48.4 |
| 17 | C | 0.0841 | 4.52 | 4.65 | 4.6 | 10.9 | 83.5 | 60.4 |
| 18 | C | 0.1032 | 4.59 | 4.85 | 4.7 | 13.5 | 69 | 53.7 |
| 19 | C | 0.1167 | 4.38 | 4.36 | 4.4 | 14.9 | 80.2 | 49.2 |

TABLE 3

PPDr, transmittance, transmission haze, DOI, gloss and surface roughness measurements for Examples 20-29.

| Ex. | Substrate | AVG (PPDr) | Transmittance % | Haze (T) | DOI | Gloss (60°) | Gloss (85°) | Gloss (20°) | RMS (nm) |
|---|---|---|---|---|---|---|---|---|---|
| 20 | D | 4.6 | 92.4 | 6.7 | 72.3 | 86.6 | 76.5 | 63 | 238 |
| 21 | D | 4.8 | 92.3 | 9.22 | 62.5 | 71.1 | 75.3 | 46.5 | 253 |
| 22 | D | 5 | 92.3 | 11.2 | 57.9 | 59.6 | 71.9 | 37.8 | 224 |
| 23 | D | 4.8 | 92.3 | 11.7 | 54.5 | 63.3 | 70.1 | 41.4 | 272 |
| 24 | D | 4.7 | 92.3 | 10.2 | 63.6 | 65.1 | 76.1 | 42.7 | 207 |
| 25 | D | 5 | 92.3 | 7.82 | 62.9 | 67.8 | 77.3 | 43 | 229 |
| 26 | D | 4.9 | 92.3 | 12.4 | 51.2 | 62 | 69.4 | 38.9 | 310 |
| 27 | D | 4.9 | 92.3 | 17.5 | 53.1 | 57.8 | 60 | 37.3 | 336 |
| 28 | D | 5 | 92.3 | 11.3 | 51.3 | 64.5 | 74.4 | 40.4 | 287 |
| 29 | D | 4.9 | 92.4 | 7.44 | 63.7 | 84.5 | 73.4 | 59.2 | 264 |

Examples 30-33

Examples 30-32 and Comparative Example 33 were prepared to characterize the correlation between sparkle (or PPDr values) and the uniformity of a textured surface. Examples 30-32 were formed by exposing a substrate having a nominal composition of Substrate B to an etchant for an exposure time of 1 to 3 minutes. The etchant had a composition of about 11.22 wt % $NH_4F$, about 8.44 wt % $NH_4HF_2$, about 4.94 wt % $NH_4Cl$, about 9.07 wt % $KNO_3$, about 5.39 wt % $BaSO_4$, about 15.35 wt % HF acid (at 40% concentration), about 4.49 wt % starch, and 41.1 wt % DI water. The etched surface was then exposed to an acid solution of HF and HCl acid for an exposure time of 5 to 20 minutes. Comparative Example 33 included a commercially available anti-glare glass.

The PPDr values of each of Examples 30-32 and Comparative Example 33 were measured (as shown in Table 4) and the images used to determine PPDr were analyzed using an image processing software to determine the feature surface areas and feature surface area distributions.

TABLE 4

PPDr values for Examples 30-32 and Comparative Example 32.

| | Ex. 30 | Ex. 31 | Ex. 32 | Comp. Ex. 33 |
|---|---|---|---|---|
| PPDr | 3.16% | 5.55% | 7.11% | 10.2% |

Figure 6:
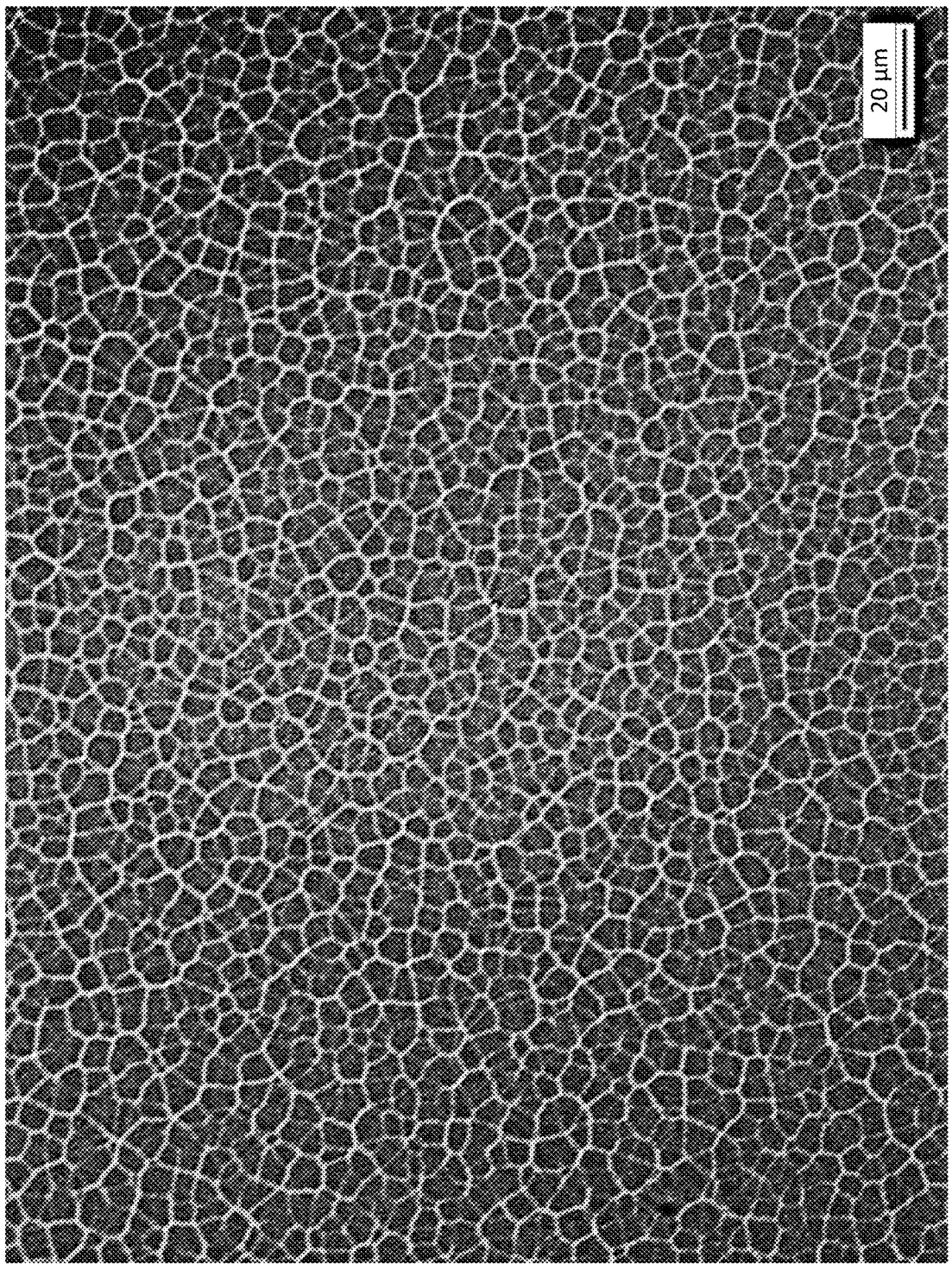
FIG. 6 shows the transmitted light optical microscope image of Example 30 at 500× magnification.
Figure 7:
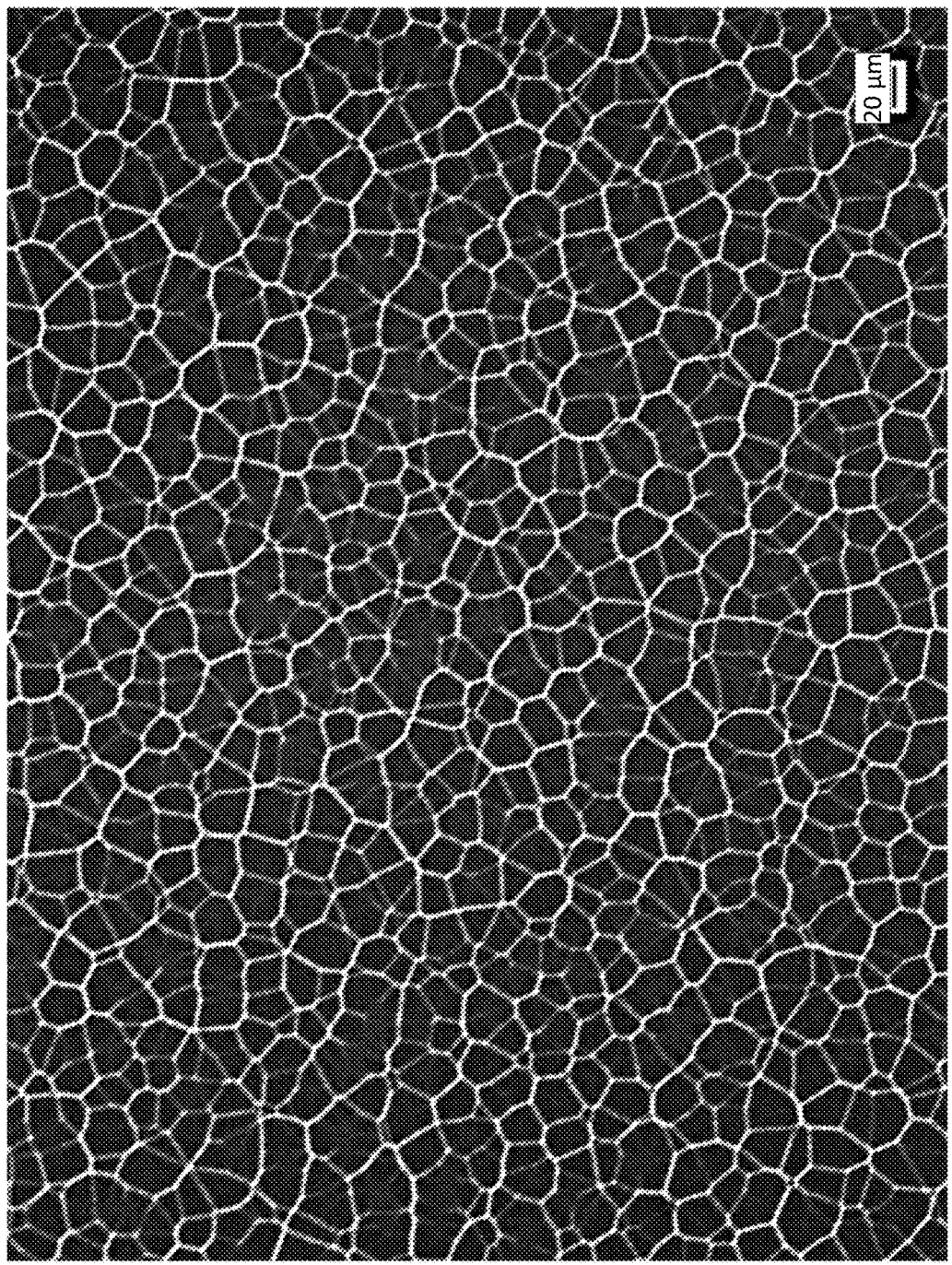
FIG. 7 shows the transmitted light optical microscope image of Example 31 at 200× magnification.
Figure 8:
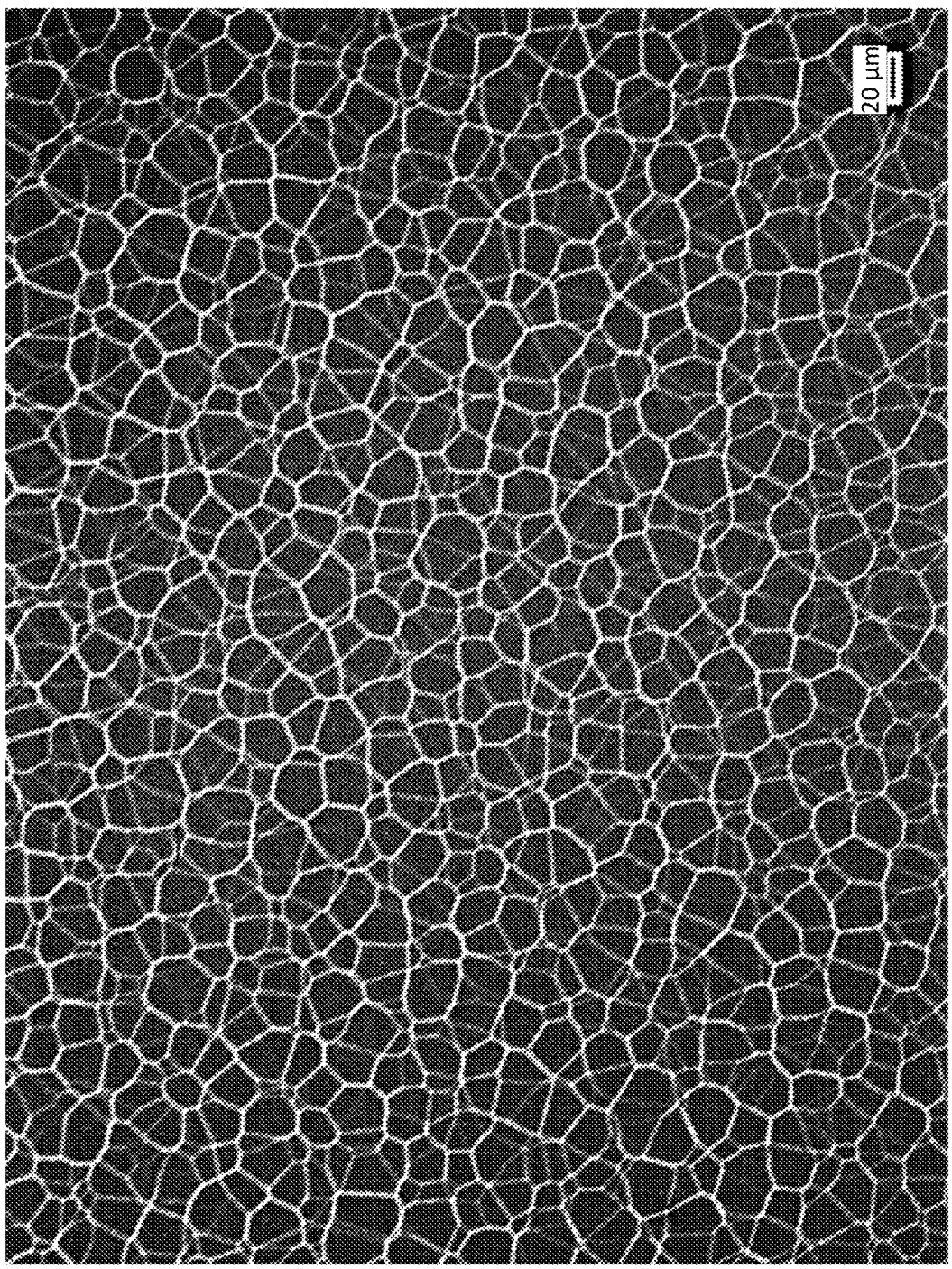
FIG. 8 shows the transmitted light optical microscope image of Example 32 at 200× magnification.
Figure 9:
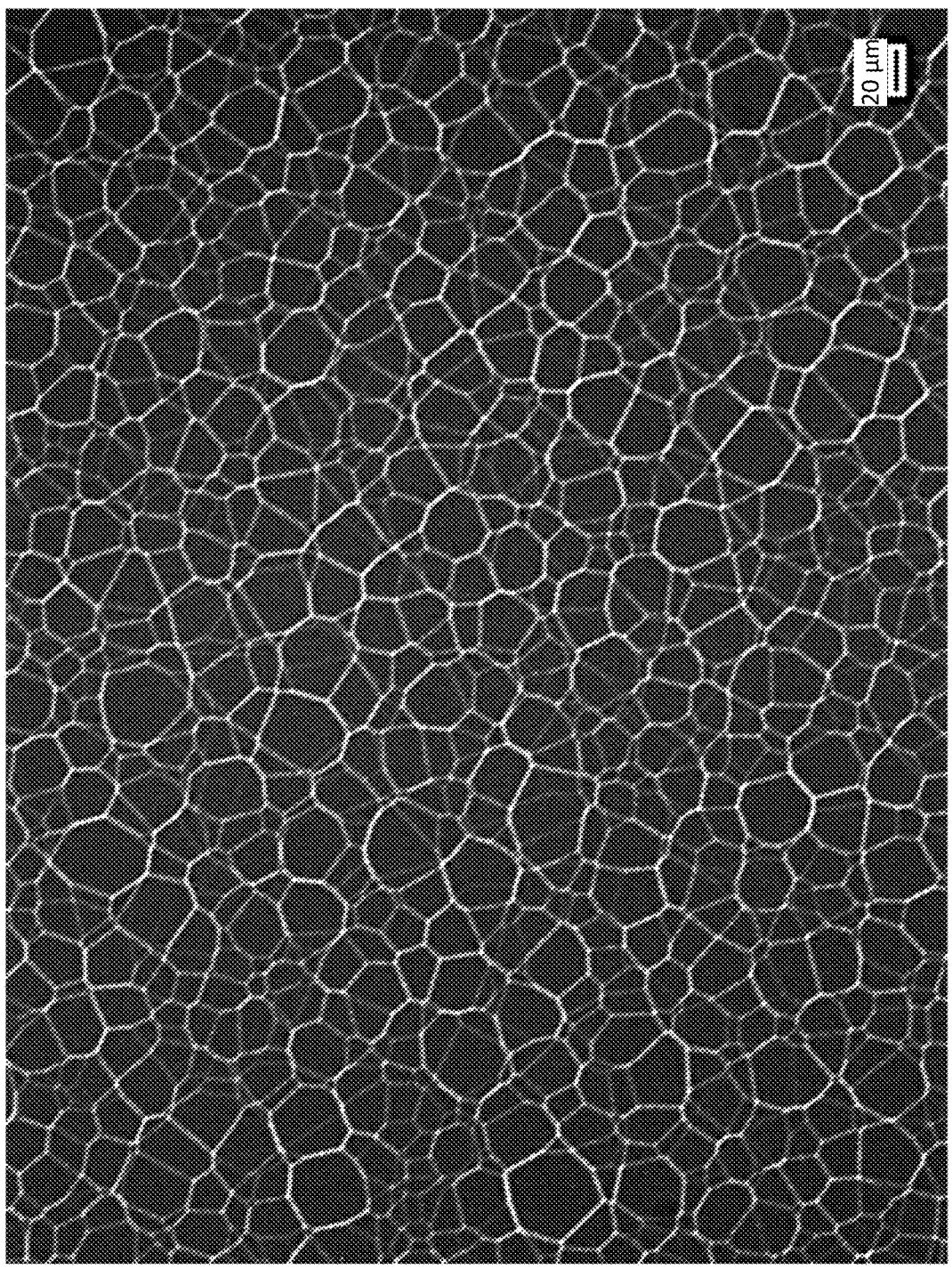
FIG. 9 shows the transmitted light optical microscope image of Comparative Example 33 at 200× magnification.

FIG. 6 shows the transmitted light optical microscope image of Example 30 at 500× magnification. FIG. 7 shows the transmitted light optical microscope image of Example 31 at 200× magnification. FIG. 8 shows the transmitted light optical microscope image of Example 32 at 200× magnification. FIG. 9 shows the transmitted light optical microscope image of Comparative Example 33 at 200× magnification.

Figure 10:
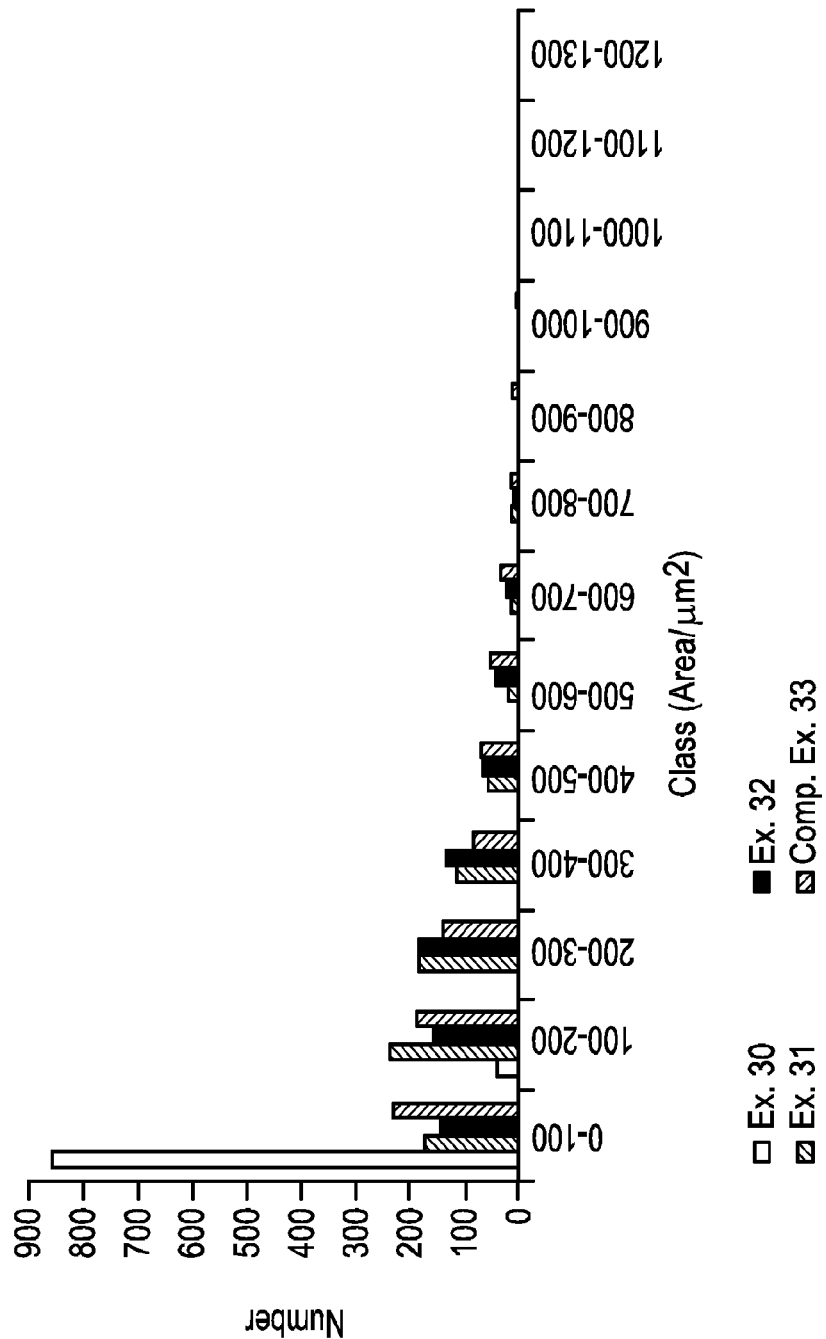
FIG. 10 is a bar graph showing the feature surface area distribution of Examples 30-32 and Comparative Example 33.
Figure 11:
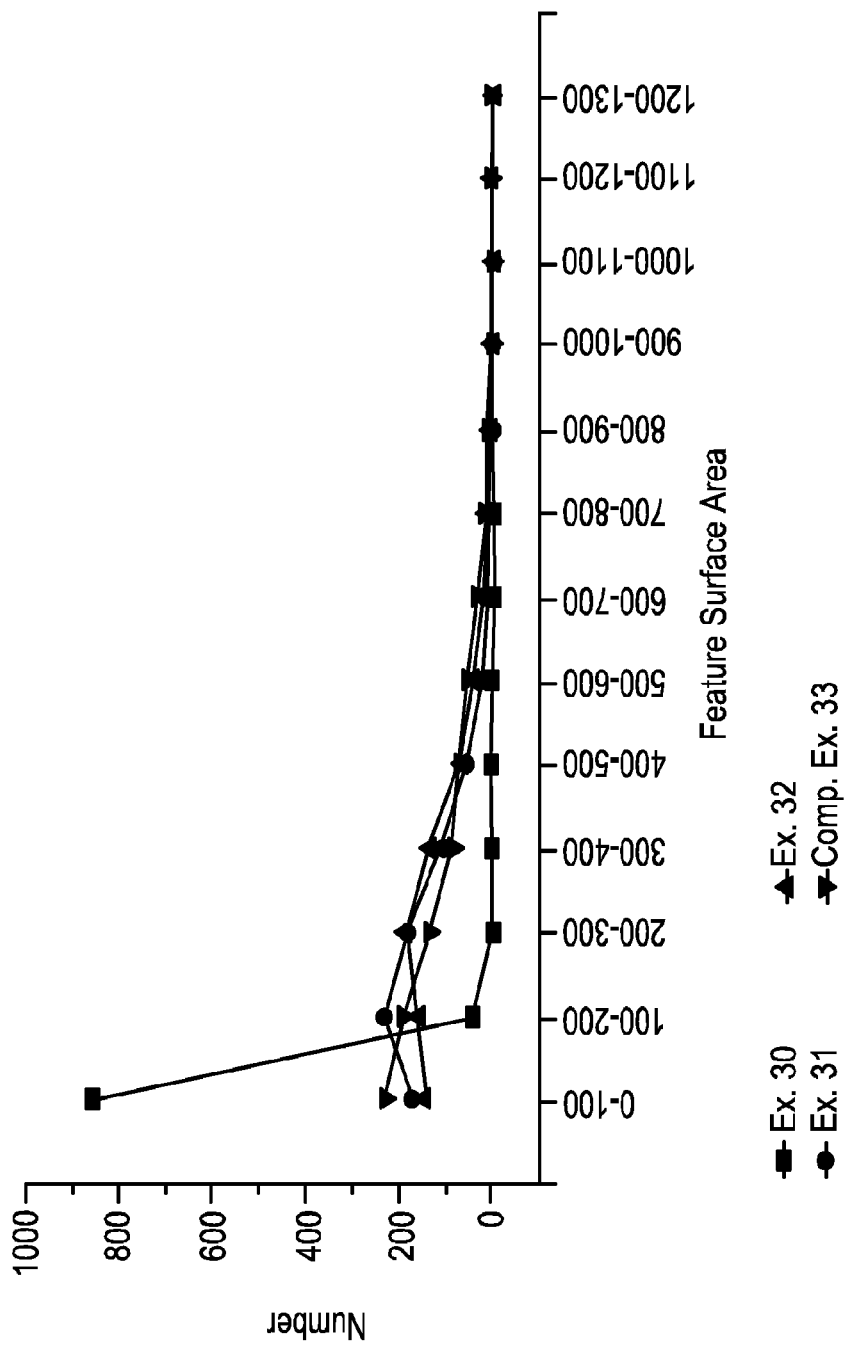
FIG. 11 is a line graph showing the feature surface area distribution of Examples 30-32 and Comparative Example 33.

Through image processing and calculation, the statistical analysis of the surface areas of the features and the feature surface area distribution of each of Examples 30-32 and Comparative Example 33 was performed and is shown in Table 5 and in FIGS. 10 and 11. FIGS. 10 and 11 graphically show the data of Table 5, and illustrate the feature area distribution of Examples 30-32 and Comparative Example 33. As shown in FIGS. 10 and 11, FIG. 30 has a narrow feature surface area distribution and thus, exhibits low PPDr. Comparative Example 33 has the widest feature surface area distribution and exhibits the highest PPDr.

TABLE 5

Image analysis results of the feature area distributions of Examples 30-32 and Comparative Example 33.

| Surface area range | Ex. 30 No. of features having area | Ex. 30 % of features having area | Ex. 31 No. of features having area | Ex. 31 % of features having area | Ex. 32 No. of features having area | Ex. 32 % of features having area | Comp. Ex. 33 No. of features having area | Comp. Ex. 33 % of features having area |
|---|---|---|---|---|---|---|---|---|
| 0-100 | 857 | 95.22 | 171 | 21.03 | 144 | 18.65 | 231 | 27.60 |
| 100-200 | 43 | 4.78 | 236 | 29.03 | 157 | 20.34 | 189 | 22.58 |
| 200-300 | 0 | 0.00 | 185 | 22.76 | 185 | 23.96 | 138 | 16.49 |
| 300-400 | 0 | 0.00 | 114 | 14.02 | 135 | 17.49 | 86 | 10.27 |
| 400-500 | 0 | 0.00 | 58 | 7.13 | 66 | 8.55 | 70 | 8.36 |
| 500-600 | 0 | 0.00 | 20 | 2.46 | 43 | 5.57 | 54 | 6.45 |
| 600-700 | 0 | 0.00 | 15 | 1.85 | 23 | 2.98 | 33 | 3.94 |
| 700-800 | 0 | 0.00 | 12 | 1.48 | 11 | 1.42 | 14 | 1.67 |
| 800-900 | 0 | 0.00 | 0 | 0.00 | 5 | 0.65 | 13 | 1.55 |
| 900-1000 | 0 | 0.00 | 0 | 0.00 | 2 | 0.26 | 4 | 0.48 |
| 1000-1100 | 0 | 0.00 | 2 | 0.25 | 1 | 0.13 | 2 | 0.24 |
| 1100-1200 | 0 | 0.00 | 0 | 0.00 | 0 | 0.00 | 2 | 0.24 |
| 1200-1300 | 0 | 0.00 | 0 | 0.00 | 0 | 0.00 | 1 | 0.12 |

Figure 12:
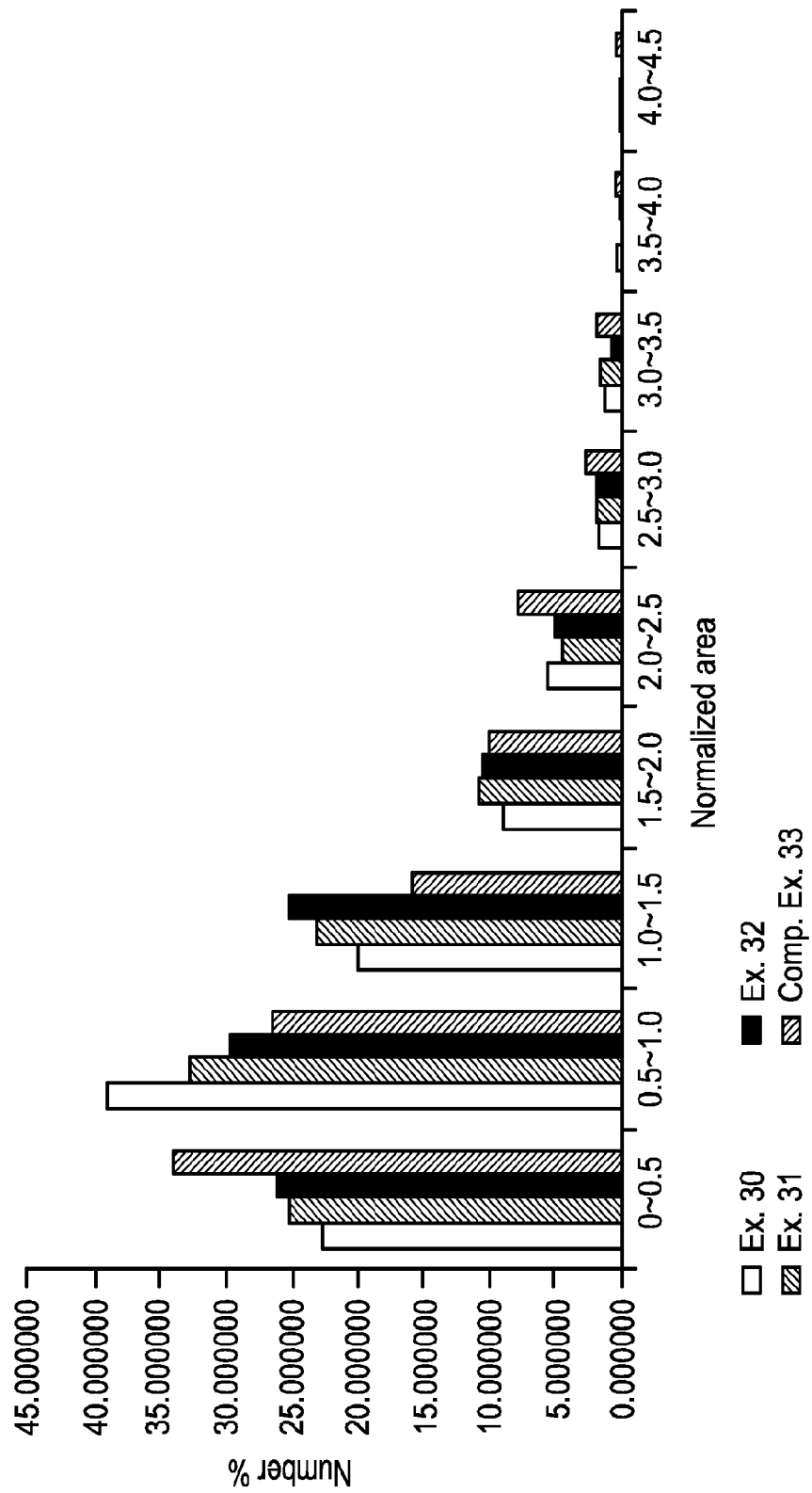
FIG. 12 is a bar graph showing the normalized area distribution of the features of Examples 30-32 and Comparative Example 33.
Figure 13:
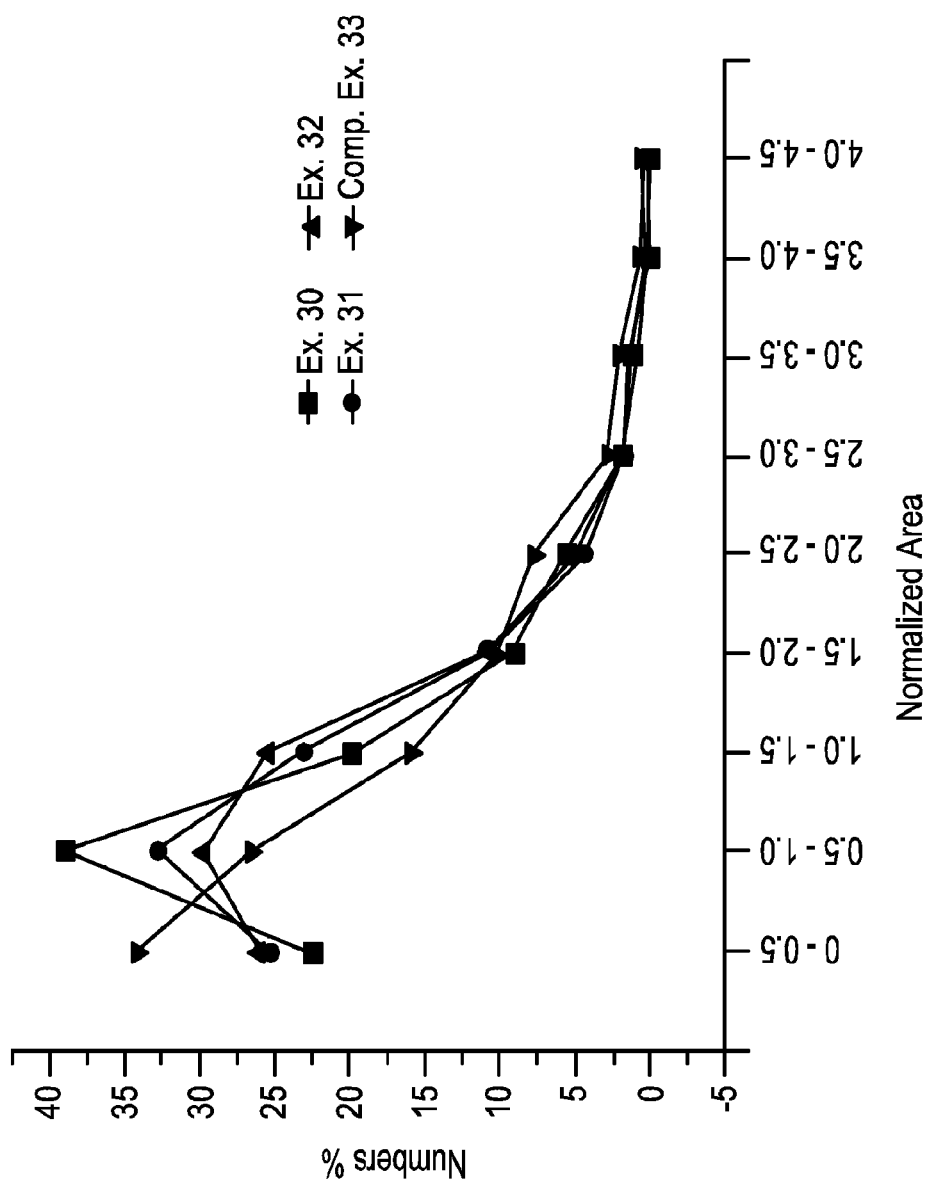
FIG. 13 is a line graph showing the normalized area distribution of the features of Examples 30-32 and Comparative Example 33.

Each of the feature surface area distributions for Examples 30-32 and Comparative Example 33 was normalized by the mathematic average feature area for each example to provide a normalized area. The normalized area distribution is shown in Table 6 and is illustrated in the corresponding distribution plots shown in in FIGS. 12-13. As shown in FIGS. 12 and 13, PPDr has strong correlation with the normalized feature area distribution.

TABLE 6

Image analysis results of the normalized area distributions of Examples 30-32 and Comparative Example 33.

| Normalized area | Ex. 30 No. of features having normalized area | Ex. 30 % of features having normalized area | Ex. 31 No. of features having normalized area | Ex. 31 % of features having normalized area |
|---|---|---|---|---|
| 0-0.5 | 407 | 22.623680 | 205 | 25.246305 |
| 0.5-1.0 | 700 | 38.910506 | 265 | 32.635468 |
| 1.0-1.5 | 358 | 19.899944 | 188 | 23.152709 |
| 1.5-2.0 | 162 | 9.005003 | 88 | 10.837438 |
| 2.0-2.5 | 102 | 5.669817 | 36 | 4.433498 |
| 2.5-3.0 | 32 | 1.778766 | 16 | 1.970443 |
| 3.0-3.5 | 26 | 1.445247 | 13 | 1.600985 |
| 3.5-4.0 | 8 | 0.444691 | 0 | 0.000000 |
| 4.0-4.5 | 4 | 0.222346 | 1 | 0.123153 |

| Normalized area | Ex. 32 No. of features having normalized area | Ex. 32 % of features having normalized area | Comp. Ex. 33 No. of features having normalized area | Comp. Ex. 33 % of features having normalized area |
|---|---|---|---|---|
| 0-0.5 | 201 | 26.036269 | 284 | 33.97129 |
| 0.5-1.0 | 229 | 29.663212 | 221 | 26.43541 |
| 1.0-1.5 | 196 | 25.388601 | 133 | 15.90909 |
| 1.5-2.0 | 82 | 10.621762 | 84 | 10.04785 |
| 2.0-2.5 | 40 | 5.181347 | 65 | 7.77512 |
| 2.5-3.0 | 16 | 2.072539 | 23 | 2.751196 |
| 3.0-3.5 | 7 | 0.906736 | 17 | 2.033493 |
| 3.5-4.0 | 1 | 0.129534 | 5 | 0.598086 |
| 4.0-4.5 | 0 | 0.000000 | 4 | 0.478469 |

The narrow distribution of Example 30 can be correlated to the lower PPDr of the same, while the wider distribution of the feature area of Comparative Example 33 can be correlated to the higher PPDr of the same. Specifically, the percentage of normalized areas 0.5-1.0 and 1.0-1.5 and the correlated PPDr is shown in Table 7.

TABLE 7

Normalized area, percentage of features having the normalized area and PPDr for Examples 30-32 and Comparative Example 33.

| | Ex. 30 | Ex. 31 | Ex. 32 | Comp. Ex. 33 |
|---|---|---|---|---|
| PPDr | 3.16 | 5.55 | 7.11 | 10.2 |
| Percentage of features having normalized area 0.5-1 or 1-1.5 | 58.8% | 55.7% | 55.0% | 42.3% |

As shown in Tables 6 and 7 and FIGS. 12-13, a narrower feature surface area distribution resulted in lower PPDr. On the other hand, when a greater number of features fall within the normalized area range 0-0.5, PPDr increased. When the percentage of features having a larger surface area increases, PPDr also increases. Accordingly, the data suggests that PPDr is correlated with the feature surface area distribution, (i.e. a more uniform textured surface, with features having similar surface areas, results in lower PPDr).

It will be apparent to those skilled in the art that various modifications and variations can be made without departing from the spirit or scope of the invention.

What is claimed is:

1. An anti-glare article comprising:
    a substrate having a surface;
    a plurality of features disposed on the surface,
        wherein 50% or more of the plurality of features comprise a normalized area in the range from 0.5 to 1.5, wherein the normalized area is defined as the relationship of a surface area of a feature divided by an average surface area of all features, and wherein 90% or more of the plurality of features have a surface area of 100 $\mu m^2$ or less.

2. The anti-glare article of claim 1, wherein the article exhibits a PPDr of 5% or less, wherein the PPDr is a low pixel power deviation reference.

3. The anti-glare article of claim 2, wherein the article exhibits a transmission haze of less than 20%.

4. The anti-glare article of claim 2, wherein the substrate surface exhibits a gloss at 60° of 87% or less.

5. The anti-glare article of claim 1, wherein the article exhibits a transmission haze of greater than or equal to 6.7% to less than or equal to 17.5%.

6. The anti-glare article of claim 1, wherein the substrate surface exhibits a gloss at 60° of greater than or equal to 62% to less than or equal to 86.6%.

7. The anti-glare article of claim 1, wherein the substrate surface exhibits a gloss at 85° of greater than or equal to 60% to less than or equal to 77.3%.

8. The anti-glare article of claim 1, wherein the substrate surface exhibits a gloss at 20° of greater than or equal to 37.3% to less than or equal to 63%.

9. A method of forming a substrate with an anti-glare surface comprising
etching a portion of a first surface of a substrate with an etchant to provide an etched surface, the etchant comprising a water soluble metal ion salt; and
removing a portion of the etched surface to provide the anti-glare surface,
wherein the anti-glare surface comprises a plurality of features, and
wherein 50% or more of the plurality of features comprise a normalized area in the range from 0.5 to 1.5, the normalized area is defined as the relationship of a surface area of a feature divided by an average surface area of all features, and wherein 90% or more of the plurality of features have a surface area of 100 μm$^2$ or less.

10. The method of claim 9, wherein the water soluble metal ion salt comprises any one or more of $CuCl_2$, $Cu(NO_3)_2$, $CuSO_4$, $FeCl_3$, $Fe_2(SO_4)_3$, $Fe(NO_3)_3$, $CoCl_2$, $Co_2SO_4$, $Co(NO_3)_2$, $NiCl_2$, $Ni_2SO_4$, $Ni(NO_3)_2$, $ZnCl_2$, $Zn_2SO_4$, $Zn(NO_3)_2$, $CaCl_2$), $Ca_2SO_4$, $Ca(NO_3)_2$, $MgCl_2$, $Mg_2SO_4$, $Mg(NO_3)_2$ and $NH_4Cl$.

11. The method of claim 9, wherein the etchant comprises a fluoride containing acid and a filler.

12. The method of claim 11, wherein the fluoride containing acid comprises any one or more of $NH_4F$ and $NH_4HF_2$.

13. The method of claim 11, wherein the filler comprises an inorganic salt.

14. The method of claim 13, wherein the inorganic salt comprises any one or more of $BaSO_4$, $CaF_2$, $MgF_2$ and kaolin.

15. The method of claim 9, wherein the etchant comprises a soluble starch, a soluble polymeric surfactant or a combination of a soluble starch and a soluble polymeric surfactant.

16. The method of claim 15, wherein the soluble polymeric surfactant comprises any one or more of polyacrylamide, polyacrylic acid, and poly(styrenesulfonate).

17. The method of claim 9, wherein the etchant further comprises $KNO_3$.

18. The method of claim 9, further comprising forming an acid-resistant film on a second surface of the substrate before etching of the first surface.

19. The method of claim 9, wherein etching a portion of the first surface of the substrate comprises contact the first surface with the etchant for less than 5 minutes.

20. The method of claim 19, wherein removing a portion of the etched surface comprises contacting the etched surface with an acid solution for less than 15 minutes.

* * * * *

UNITED STATES PATENT AND TRADEMARK OFFICE
CERTIFICATE OF CORRECTION

PATENT NO. : 10,690,818 B2
APPLICATION NO. : 15/508307
DATED : June 23, 2020
INVENTOR(S) : Haixing Chen et al.

It is certified that error appears in the above-identified patent and that said Letters Patent is hereby corrected as shown below:

On the Title Page

On page 2, in Column 2, item (56), Other Publications, Line 14, after "LCD" insert -- with --.

In the Claims

In Column 20, Line 3, Claim 10, delete "$CaCl_2$)," and insert -- $CaCl_2$, --, therefor.

Signed and Sealed this
Thirteenth Day of October, 2020

Andrei Iancu
*Director of the United States Patent and Trademark Office*